United States Patent [19]

Bullock et al.

[11] Patent Number: 4,721,093
[45] Date of Patent: Jan. 26, 1988

[54] LINE ILLUMINATION SYSTEM

[75] Inventors: Michael K. Bullock, Matthews; Frederick C. Miller, Charlotte, both of N.C.

[73] Assignee: International Business Machines Corp., Armonk, N.Y.

[21] Appl. No.: 879,687

[22] Filed: Jun. 27, 1986

[51] Int. Cl.$^4$ .............................................. F21V 7/00
[52] U.S. Cl. .................................. 362/308; 362/217; 362/301
[58] Field of Search ............... 362/308, 217, 297, 299, 362/301

[56] References Cited

U.S. PATENT DOCUMENTS

| | | | |
|---|---|---|---|
| 3,179,007 | 4/1965 | Benford | 353/61 |
| 4,225,923 | 9/1980 | Bloemendaal et al. | 362/301 |
| 4,473,865 | 9/1984 | Landa | 362/217 X |

*Primary Examiner*—Larry Jones
*Attorney, Agent, or Firm*—Kenneth A. Seaman; Mitchell S. Bigel

[57] ABSTRACT

An illumination system for illuminating a line on a document which illumination, when reflected and focused via a lens on a sensor (or image plane), has substantially uniform light intensity along the length of the line. The illumination system includes means for compensation for lens cosine to the fourth power fall-off and an illumination cosine fall-off phenomenon, which has classically been treated as proportional to cosine to the fourth power but in the example of lamps made of coiled tungsten filaments located along the axis of the foci, is more nearly cosine to the 2.8th power. The compensation apparatus includes a cylindrical ellipse for focusing light from two lamps located on an axis which is one foci of the ellipse and the line on the document is located at the other foci of the ellipse. Reflected light from the line on the document is then reflected and focus via a lens onto a sensor. At the sensor, the image is captured for analysis or other uses, e.g., using conventional techniques for character recognition or image processing. The uniform intensity at the sensor can be facilitated by the use of appropriate dimensional relationships between components of the imaging system.

5 Claims, 10 Drawing Figures

LINE ILLUMINATION SYSTEM

BACKGROUND OF THE INVENTION

The present invention relates to improvements in an illumination system for illuminating a line on a document. More particularly, the present invention relates to a slot reader or a page reader in which successive lines or segments are illuminated and the images are reflected through a lens to a sensor array.

The illumination systems of the prior art have the limitations that, without modification of the incident light and/or its path, the image at the sensor array (also sometimes referred to as the image plane) is more intense at the center of the array than at the edges. In fact, the light intensity at the sensor array has been theoretically calculated to decrease proportionally to the cosine to the fourth power of the angle between a given incoming light ray and a line through the center of the lens. This means that the illumination at a sensing array is normally highest at the center and reduces progressively toward the edges (as the angle from the center of the lens to a corresponding point on the sensing array increases.) This phenomenon has been, therefore, referred to as a lens-cosine to the fourth power (lens-cosine$^4$) fall-off.

A similar fall-off of light illumination intensity occurs as a result of use of illumination sources, such as lamps, where designers have traditionally modelled such sources as point sources.

Several techniques have been suggested in previous optical systems for dealing with the lens cosine$^4$ fall-off phenomenon described above. These techniques include masks, "dog-bones", or gratings which have the effect of removing or discarding part of the incident light in the central regions in an attempt to have a uniform light as sensed at the sensing planar array. These systems described in this paragraph are undesirable because they are inefficient, difficult and expensive to manufacture and pose maintenance difficulties when the lamps need replacing. The efficiency is low because the discarded light means that a greater intensity lamp must be used, creating additional heat and possibly involving an assembly having a greater size. The dog-bones, masks and grating all require additional parts which must be manufactured, stocked and assembled into the system. Further, since these parts are in the vicinity of the lamps, replacement of the lamps may require some disassembly of the masks or gratings, and then require reassembly in the same location after the bulb has been changed.

The prior art has suggested solutions which deal with other problems associated with optical imaging systems including a lens. In U.S. Pat. No. 4,506,152 to Gupta, a system for compensating for lens vignetting is proposed in which a mirror in the form a cylindrical ellipse has end caps and additional reflecting mirrors positioned adjacent the document adjust for the vignetting effect of a lens having a F-number less than 2.0. Lens vignetting refers to a shadow cast by a lens barrel on the lens elements. This patent teaches that lens vignetting of 40% can be reduced to a less than 10% variation in intensity through the use of a five mirror system. Accordingly, this patent addresses a different problem from that discussed with respect to the present invention, and solves its problem by adding a significant number of pieces, each of which adds expense and size and bulkiness to the assembly.

Various other techniques have been proposed to improve the quality of a reflected image, including IBM Technical Disclosure Bulletin, Vol. 15, No. 2, Page 521 directed to reducing the shadows in a photocopy machine.

As is apparent from the foregoing description of the prior art identified above, there are significant disadvantages and limitations in such approaches to providing a quality and uniform image reflected off an input document and onto a planar array sensor.

SUMMARY OF THE INVENTION

The present invention overcomes the limitations and disadvantages of the prior art by providing an illumination system in which the reflected image on the sensor array is uniform without the inefficiencies and disadvantages of multiple parts or the waste of a portion of the illumination which otherwise is available.

The present invention is an illumination system in which illumination at the sensor array is substantially uniform without discarding any portion of the illumination originally generated and without using extraneous elements such as "dog-bones" or gratings.

The present system also has the advantage that a deviation in illumination intensity of substantially less than 5% over the footprint of light at the lens image plane is attained in representative geometries discussed.

An advantageous effect of the present invention is that the illumination system is compact and takes up a small volume within an enclosure. Further, it is advantageous that the elements permit easy insertion and replacement of lamps, desirable since the lamps have a finite life which is much less than the life of the entire assembly, and therefore require replacement periodically.

The present invention also recognizes that the geometry of the lamps may provide a cosine fall-off function similar to the lens-cosine$^4$ fall-off function but differs since the exponent is not to the fourth power, but to the 2.8th power of the cosine of the included angle. This system allows a compensation for the actual cosine fall-off, either as calculated or as observed, without having to rely on theoretical values. The present invention is directed to an illumination system in which a lens may have little or no vignetting.

Other objects and advantages of the present invention will be apparent to those skilled in the art in view of the following description of the preferred embodiment, taken together with the appended claims and the accompanying drawings.

BEST MODE OF CARRYING OUT THE INVENTION

Figure 1:
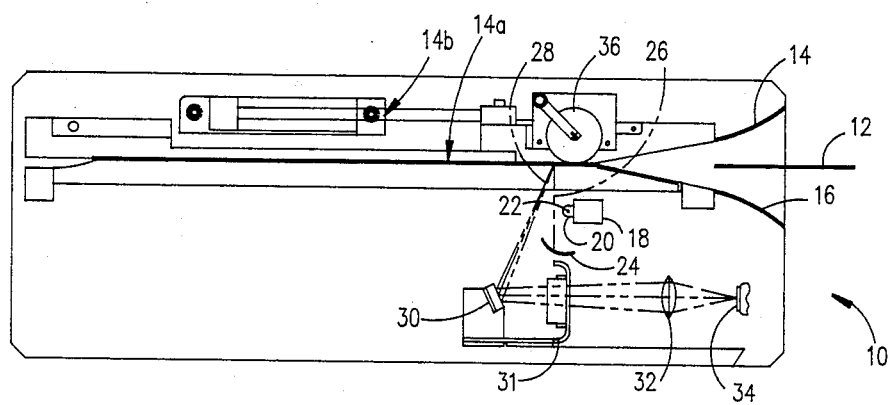
FIG. 1 is a top view of a slot reader including the present invention, the slot reader having its cover and top reflector removed for illustration.

FIG. 1 illustrates a slot reading assembly 10 suitable tor use with the line illumination package of the present invention. As shown in this view, a document 12 is moved along a path defined between rails 14a, 16a. A lamp mounting 18 carrying a lamp 20 with a filament 22 is mounted adjacent the rail 16a. Illumination from the lamp 20 is directed by a cylindrical ellipse mirror surface 24 along an incident path 26, then off the document (when the document passes an aperture (not shown) in the rail 16a) and as reflected path 28 to a mirror 30, then through a filter 31 and a lens 32, onto a sensor array 34. An emitter wheel 36 is mounted to the rail 14a and extends through the rail 14a so that the document 12 passing through the rails for reading is in frictional contact with the emitter wheel 36 to thereby rotate the wheel 36 at the same speed as the document is passing. This emitter wheel 36 then provides pulses which each indicate a predetermined amount of movement of the document along the path between the rails 14a, 16a. By suitable use of software and the signals from the sensor array 34, vertical slices of information or images from the document can be separated and stored or analyzed in any of the various well-known manners.

The emitter wheel 36 has been used to advantage in a variety of applications using hand-moved members traversing through a device. In particular, one might compare the system shown and described in U.S. Pat. No. 3,914,789 to Coker et al. for a description of the operation of one such emitter system.

The foregoing description is in the context of a slot reading assembly 10 in which a document or a credit card, passbook or other unit record member is moved by hand across an aperture through which an illumination light is directed and reflected onto a sensing array. Of course, there is nothing unique to the type of unit record being moved in this example or to the hand-movement of the item, but both are well-known in the prior art.

In the present slot reader, the rail 14 may include a movable wall member or platen 14a and spring means 14b for urging the wall member toward the other rail 16a, so that variable thickness media may be accommodated. This variable thickness media might include a single sheet of paper on one pass, multiple sheets of paper bound together as in the form of a passbook on a second occasion and a credit card on yet another instance. The movable platen 14a allows each to be accommodated without allowing the media (i.e., the document 12) to move about in the slot in an uncontrolled manner.

The sensor array 34 is, in its preferred embodiment, a commercially available charge coupled device (CCD) array in which a voltage for each segment or element of the display is proportional to the amount of light incident on the segment or element.

Of course, the slot reader assembly 10 of the present invention may include other systems for handling information including magnetic heads such as are used in the reading of magnetic stripes on credit cards. Such additional uses for the slot reader are unrelated to the present invention and have no necessary interrelation, other than being mounted in the same package.

Figure 2:
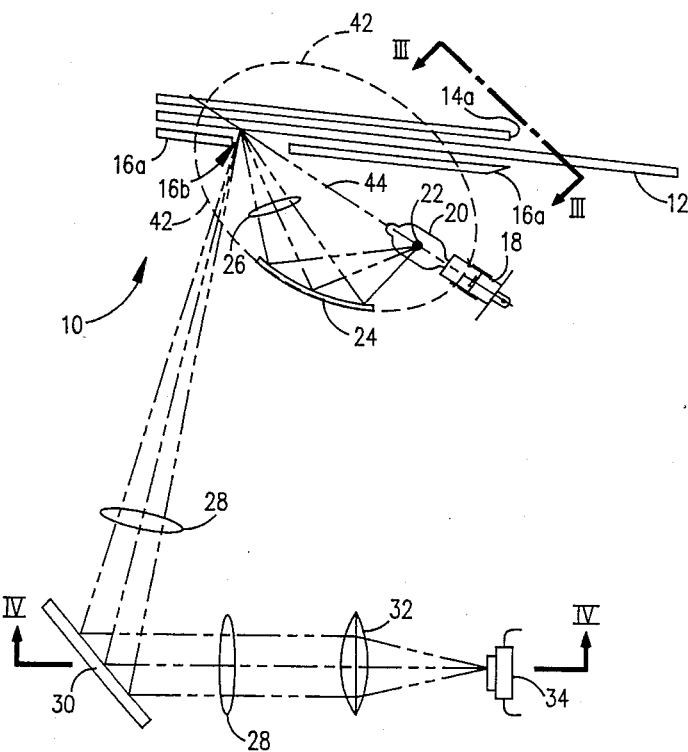
FIG. 2 is an enlarged view of the optical path of the slot reader of FIG. 1.

FIG. 2 illustrates an enlarged, somewhat diagrammatic illustration of a portion of the slot reader 10 described and shown in connection with FIG. 1. In this view, which is not to scale, the rails 14a, 16a are shown on either side of the document 12. The one rail 16a has an aperture or light transmitting slot 16b for passing illumination therethrough. The mirror surface 24 in the shape of a section of a cylindrical ellipse is shown, with the remainder of the ellipse 42 drawn in dotted lines and its major axis plane 44 depicted. The lamp filament 22 is shown located at one foci of the ellipse and the document 12 passing by the slot or aperture 16b in the rail 16a is located at the other foci of the ellipse, so that light from the filament is reflected off the mirror surface 24 and focused onto the document along incident light path 26. The light traveling from the mirror to the document is incident and shown by the reference numeral 26, and light is reflected off the document along the reflective path depicted by the reference numeral 28. Flat end mirrors, not shown in this FIG. 2, are included in the illumination system and are described and shown in connection with later figures, e.g., FIGS. 3 and 5.

Figure 3:
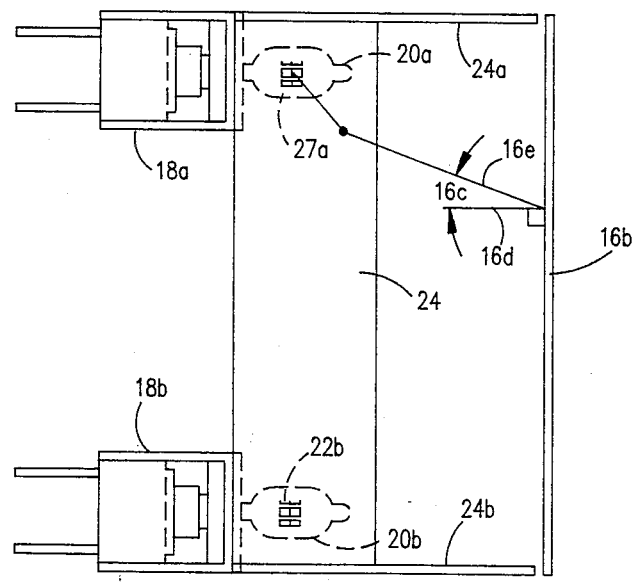
FIG. 3 is a view taken from the line III—III in FIG. 2 looking in the direction of the arrows.

FIG. 3 illustrates a side view of the illumination system of the slot reading assembly 10 taken from the line III—III in FIG. 2, looking in the direction of the arrows. In this view, the aperture 16b is shown as an elongated rectangle and the cylindrical mirror 24 is shown as a rectangle also. Mounted to the cylindrical ellipse mirror 24 are flat end mirrors 24a, 24b which each extend perpendicular to the axis of the cylinder and extend outwardly toward the aperture 16b from the mirror 24. As shown in this view, there are a pair of lamp mountings 18a, 18b, each mounting a lamp 20a, 20b, located above one another so that the top views of FIG. 1 and 2 hide one below the other. Each lamp includes a filament 22a, 22b which is coiled and the coil extends generally along the length of the axis of one foci of the cylindrical ellipse mirror 24.

Figure 6:
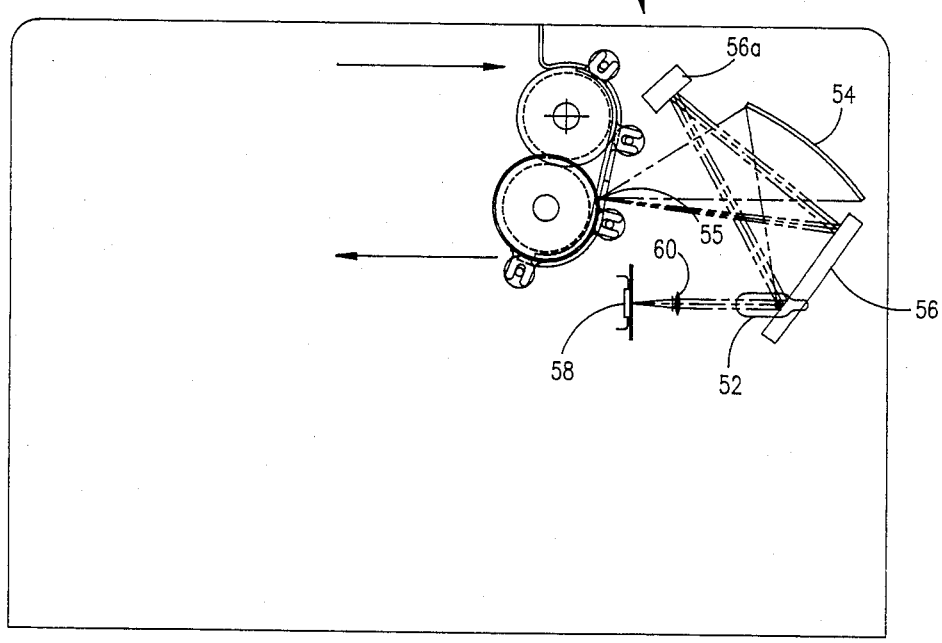
FIG. 6 is an illustration of the present invention in the context of a document scanner.

The lamps 22 are each made by General Electric and sold as its GE part number 3029 for the embodiment of FIGS. 1–5 and DZE/FDS 150 watt, 24 volt projection bulbs for the embodiment of FIG. 6. These lamps each include a tungsten filament which includes a coil portion. The center line of the filament coil portion is positioned to be located coincident with one foci axis of the ellipse, that is, extending parallel to the axis of the cylinder. As a result of using lamps in which the filament coil is located along the axis of the foci of the cylindrical ellipse, the cosine fall-off of light arriving at the aperture 16b is proportional to the cosine to the 2.8th power of an angle marked 16c in FIG. 3. This angle 16c is shown between a normal or perpendicular line 16d to the aperture 16b and an incident light ray 16e, which is shown with an apparent jog between the filament 22a and the mirror 24 due to a reflection off of the mirror 24.

Figure 4:
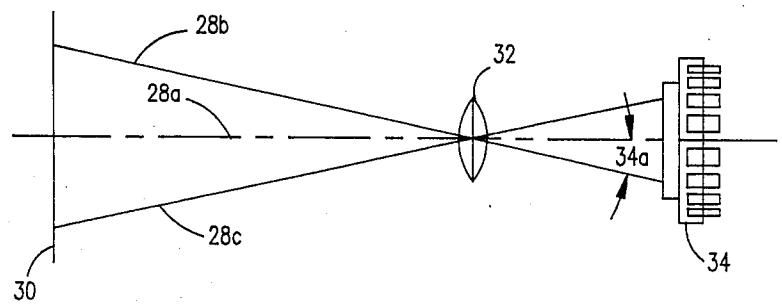
FIG. 4 is an enlarged cross-sectional view taken along the line IV—IV in FIG. 2 looking in the direction of the arrows, to illustrate the angle of lens-cosine fall-off.

In FIG. 4, three light rays 28a, 28b and 28c are illustrated as they may be reflected from the mirror 30. Light ray 28a is the optical centerline of the lens 32.

The rays 28b, 28c are inverted by the lens 32 and strike the array 34. The centerline ray 28a normal to the lens and passing through the center line of the lens, which, in the preferred embodiment also passes through the center of the document. The ray 28c is a ray which may have been reflected off the bottom of the document and the ray 28b off the top of the document. An angle 34a has been shown between the centerline ray 28a and another ray 28b. This angle 34a is the angle which is used in the cosine-to-the-fourth power calculations for lens roll-off calculations as a result of the lens 32.

Figure 5:
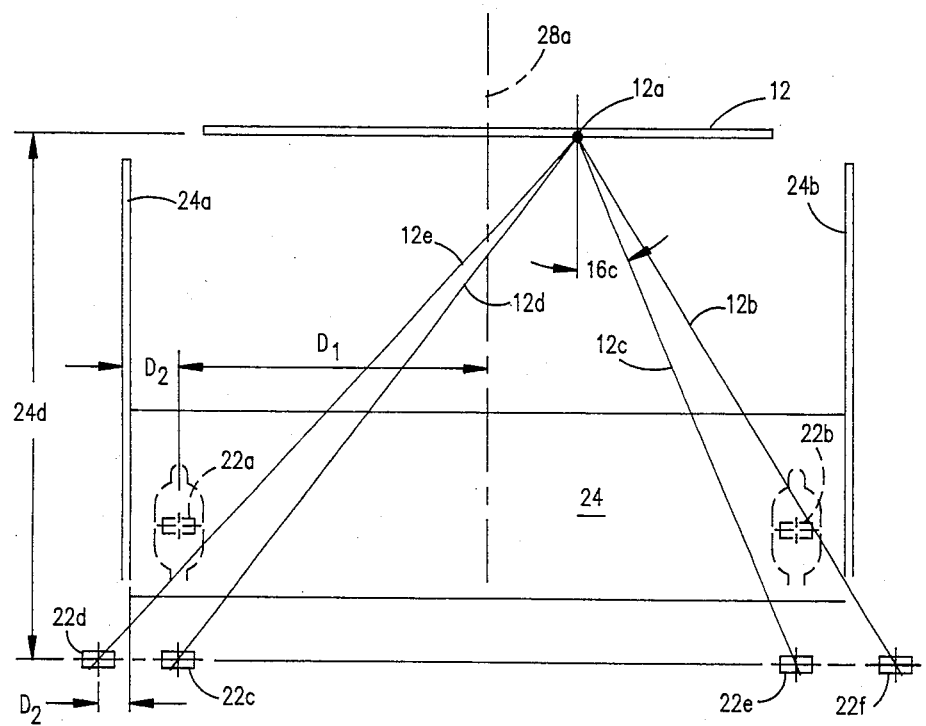
FIG. 5 is a view of the illumination sources of the illumination package to illustrate illumination intensity calculations.

FIG. 5 illustrates the geometry of the system of FIGS. 1-4 from which computer simulations of illumination intensity such as FIG. 7 can be calculated. In FIG. 5, the filaments 22a, 22b, the mirror 24, the flat end mirrors 24a, 24b and the document 12 are shown in a view which is somewhat like the view of FIG. 3. In this view, the filaments 22a, 22b are located a distance D1 from a centerline ray 28a and a distance D2 inward from the flat end mirrors 24a, 24b, respectively. The mirror 24 has a major axis 24d. The filament 22a appears to be located the distance of the major axis 24d away from the document 12 at position 22c, and the appearance of a second image 22d is presented from the reflection of the filament 22a in the flat end mirror 24a at a position 22d. This second imaginary image 22d also appears to be the major axis 24d distance removed from the document 12 and located the distance D2 from the flat end mirror 24a. In a similar fashion, the filament 22b has two images 22e, 22f located the distance of the major axis 24d removed a distance 24d from the document and distances plus or minus D2 from the flat end mirror 24b. At each point on the document, the perceived intensity of the light is equal to the sum of the intensity from each of the four apparent sources, 22c, 22d, 22e, and 22f. For a point 12a, these are illustrated by the rays 12b, 12c, 12d, and 12e.

An illustration of the angle 16c formed between a normal to the plane (or perpendicular to the document) and the ray 12c is shown in this view. A similar angle between the normal to the document and each of the other rays can be determined and is the basis for determining the illumination intensity contributed by each such ray at a point such as the point 12a. The intensity of the light arriving at the document 12 along the ray 12c is the intensity of a light ray that arrives perpendicularly to the document 12 from filament 22e times the cosine to the 2.8th power of the included angle 16c. The total light arriving at the point 12a is the sum of the light arriving from each of the four apparent sources, each corrected for the cosine to the 2.8th power. The light from filament images 22d and 22f must also be corrected for any light absorbed by (lost from) the end cap mirrors 24a, 24b, respectively.

A mathematical model can be developed to generate a good (or possibly the "best") light distribution (or illumination intensity) on the document 12. The reflected light intensity from the document 12 thus illuminated will produce a flat or uniform illumination intensity over the illuminated portion of the sensor. To some extent, the "best" system will depend on system constraints such as size of the illuminated portion on the document and size of the sensor as well as the distance of the document from the illumination package and also the sensor, distances which are dependent, in large part upon the particular device in which the system is included.

However, it has been found that the ratio of the major axis of the ellipse to the width of the illuminated area on a document is one key ratio, and a desirable ratio is for the major axis to be between 3/5 of the width to 5/4 of the width for best results. The distance between the flat end mirrors (and the length of the cylindrical ellipse mirror) to the width of the illuminated portion of the document is another key relationship. In this regard, a relationship of the distance between flat end mirrors of 1 to 1.5 times the illuminated portion of the document is desirable. Further, the distance of the filaments inwardly of the flat end mirrors in portion to the distance between flat end mirrors is a third variable which is desirable to control, and here a filament to flat end mirror distance of 3-20% of the distance between flat end mirrors is desirable.

In FIG. 6, the use of the concepts of the present invention are shown in an environment of a document scanner 50. As illustrated in this FIG. 6, lamps 52 are located at one foci of a cylindrical elliptical mirror 54 to focus light on a line slit 55 where a document passes by. The reflected light then is reflected by mirrors 56,56a through a lens 60 onto a sensor 58. In a manner similar to that described in connection with the FIGS. 1-3 embodiment, it is desired that the illumination focused on the sensor 58 by the lens 60 is nearly uniform in intensity along the length of the sensor.

FIG. 7 illustrates computer simulations of the document scanner embodiment of FIG. 6; however, the data is representative of the illumination intensity in the embodiments of FIGS. 1-4 also. FIG. 7 consists of four plots (7a, 7b, 7c, and 7d) of illumination intensities at the sensor array 34 based upon different geometries of the systems. The plots were obtained through computer simulation using the cosine to the 2.8th power fall-off discussed above, which provided a theoretical image intensity. Of course, in actual systems, the use of imperfect arrays and reflectors may introduce variations which can be not accurately predicted without detailed information on such variations. The plots were generated by placing the two filaments a distance equal to the major axis of the ellipse away from the aperture and using the imaginary image of coiled filaments formed by the flat end mirrors next to each filament. Thus, the plot is the summation at each point of the apparent illumination from each of four apparent sources with the appropriate fall-off for each of the apparent sources.

Figure 7A:
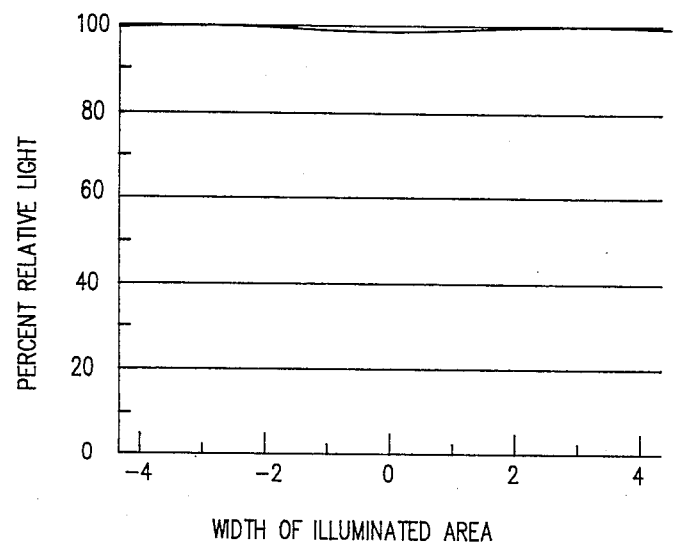
FIGS. 7a, 7b, 7c, and 7d are plots of illumination intensities at a sensor plane (image plane) for various combinations of system geometries.
Figure 7B:
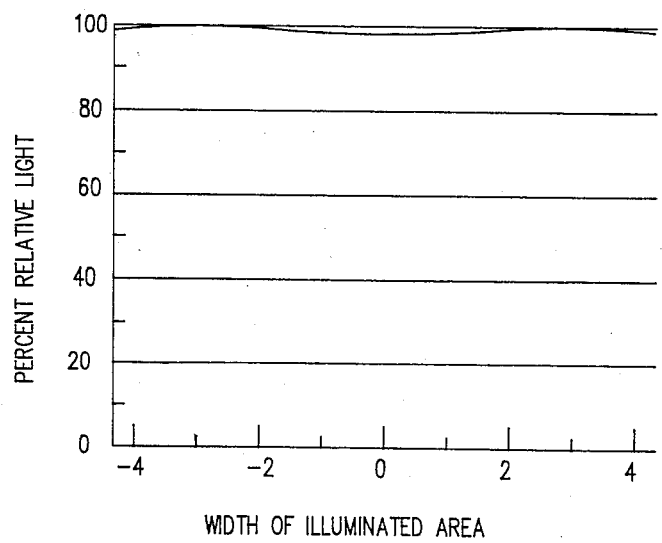
Figure 7C:
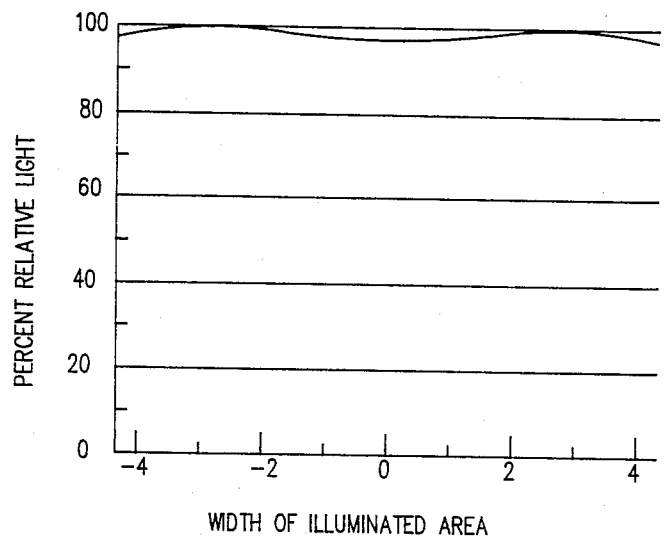

In each of the systems shown in plots of FIGS. 7a, 7b and 7c, the lens is a 50 mm, 9.6/1 magnification lens. In the system which produced the plot of FIG. 7d, the lens is a 35 mm, 9.6/1 magnification lens.

Figure 7D:
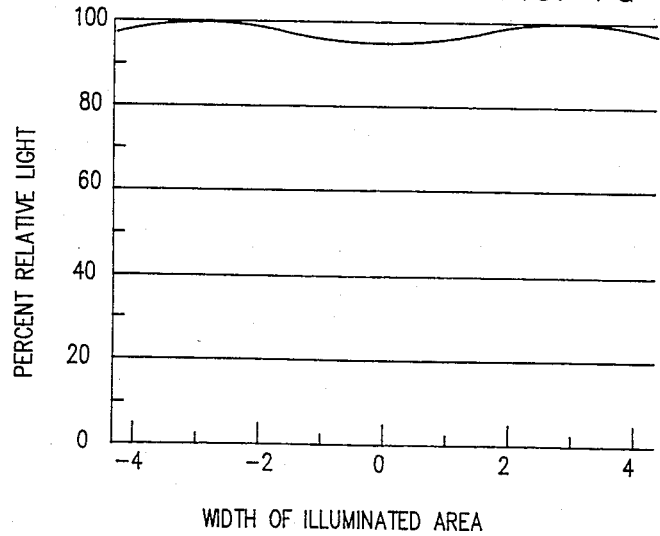

In the system which produced the plot of FIG. 7a, the assembly was 12 inches long and has a 8.3 major axis and the lamps are located ½ inch inwardly of the end caps. In the system which produced the plot of FIG. 7b, the package was 10 inches long, the major axis was 7 inches and the lamps were positioned ½ inch inwardly of the end caps. In the system of FIG. 7c, the package was 9.5 inches long and had a 6.5 inch major axis and the lamps were positioned ½ inch inwardly of the end caps. In the system of FIG. 7d, the package was 10 inches long and the major axis was 6 inches and the lamps were positioned 7/10 inch inwardly of the end caps. As is apparent from the plots, the maximum illumination variation at the image plane of the lens was between approximately 2% (in the system of FIG. 7a) and 4% (in the system of FIG. 7d) over the width of the illumination area.

Of course, many alternatives to the preferred mode of carrying out the present invention are apparent to those skilled in the art of document illumination and optical imaging onto a planar sensor array, and furthermore, some features of the present invention may be used without the corresponding use of other features described in this description. While the desirable ratios of distances have been specified with some precision in the preferred embodiment, it should be understood that some variation is possible (especially if degraded or sub-optimal results can be tolerated. Further, while the device has been described in terms of a mirror in the shape of an ellipse with the document and the lamps located at the foci of the ellipse, precision in this placement is not an absolute requirement again if less than optimum results are required. The sensor in the foregoing description has been described in what is believed to be its preferred embodiment of a CCD array, but others may use photoconductors or film to advantage in some applications. Thus, the foregoing description should be considered as merely illustrative of the preferred embodiment of the present invention and not in limitation thereof, the scope of which invention being defined solely by the appended claims.

Having thus described the invention, what is claimed is:

1. An apparatus for illuminating a line on a document to generate a reflected image which, when focused on a planar sensor has a substantially uniform intensity over the illuminated portion of said sensor, the apparatus comprising:
   a mirror including a cylindrical ellipse section having an axis extending parallel to the illuminated line on said document and flat end mirrors extending perpendicular to said axis, said elliptical mirror positioned so that one foci of the ellipse is coincident with said line on said document to be imaged onto said sensor;
   a lens for focusing illumination reflected from said document onto the sensor; and
   a light source including two lamps having filaments extending along the other foci of the ellipse, said two lamps being positioned inwardly of said flat end mirrors so that the reflected illumination from said lamps has a substantially uniform illumination intensity over the illuminated portion of said sensor.

2. An illumination apparatus of the type described in claim 1 wherein said lamps are positioned with respect to said flat end mirrors adjacent each lamp to compensate for illumination fall-off substantially proportional to cosine to the 2.8th power with respect to an angle between an incoming light ray and a line perpendicular to said document in the plane formed by the two foci axis of the cylindrical ellipse and also to compensate for lens-cosine to the fourth power fall-off resulting from the lens focusing image of said document onto said sensor, whereby the illumination intensity on said sensor is substantially uniform over the illuminated portion of the sensor.

3. An illumination apparatus of the type described in claim 1 wherein each of said lamps include a coiled filament extending about a lamp axis which is aligned with the cylindrical axis of the cylindrical ellipse mirror, each of said lamps creating an illumination intensity which falls-off substantially in proportion to the 2.8th power of the angle between an incoming light ray at said document and a line perpendicular to said document in the plane of the ellipse foci axes of the cylindrical ellipse, and in which said position of said lamps with respect to the flat end mirrors is such that the sum of the illumination intensity from the reflected images as sensed at said sensor is substantially uniform over the illuminated portion thereof.

4. An illumination system for reflecting illumination into a line of a document and thereafter onto a sensor in a substantially uniform intensity at the illuminated portion of said sensor, the system comprising:
   a pair of lamps, each providing illumination which falls-off substantially in proportion to the 2.8th power of the angle from a normal of the filament to any point on the line of the document;
   a reflector for focusing illumination from said lamps onto said document, said reflector including a first portion in said shape of an elliptical cylinder, with the lamps being positioned at one foci of the ellipse and the illuminated line on said document being positioned at the other foci of the ellipse;
   a lens positioned between said sensor and said illuminated line on said document for focusing illumination from said illuminated line onto said sensor, said lens providing illumination intensity on said sensor which has a fall-off related to the angle with respect to the normal passing through said lens; and
   two additional flat end mirrors positioned adjacent said lamps and spaced therefrom a distance so that the illumination from said two lamps and said images in the two flat end mirrors is substantially uniform along the entire length of said illuminated portion of said sensor.

5. An illumination system of the type described in claim 4 wherein the ellipse has a major axis in the range of 60% to 125% of the length of said illuminated line on said document, said flat end mirrors are separated by a distance in the range of 100% to 150% of the length of said illuminated line on said document and said lamps are each located inwardly from the respective adjacent end mirror by a distance in the range of 3% to 20% of the length of said illuminated line on said document.

* * * * *